United States Patent [19]

Lindblom et al.

[11] 4,436,248

[45] Mar. 13, 1984

[54] ADJUSTABLE SHEARBAR APPARATUS

[75] Inventors: Curtis H. Lindblom, New Holland; H. Nevin Lausch, Denver; Edward H. Priepke, Lancaster, all of Pa.

[73] Assignee: Sperry Corporation, New Holland, Pa.

[21] Appl. No.: 344,654

[22] Filed: Feb. 1, 1982

[51] Int. Cl.³ .............................................. B02C 18/16
[52] U.S. Cl. ................................. 241/101.7; 241/222; 241/241; 241/286
[58] Field of Search ................ 241/239, 240, 221–225, 241/286, 287, 241, 101.7

[56] References Cited

U.S. PATENT DOCUMENTS 4,190,209 2/1980 DeBuhr et al. ................. 241/241 X
4,295,616 10/1981 Hill ..................................... 241/241

Primary Examiner—Mark Rosenbaum
Attorney, Agent, or Firm—Frank A. Seemar; Larry W. Miller; Darrell F. Marquette

[57] ABSTRACT

A shearbar for forage harvesters includes a lever pivotally connected to a lower elongated shearbar support member. Opposed portions of the lever support opposite sides of the shearbar. An adjustment member is movable for pivoting the lever and moving the bar. A minimum number of parts avoid undesirable tolerance buildup.

5 Claims, 3 Drawing Figures

ADJUSTABLE SHEARBAR APPARATUS

BACKGROUND OF THE INVENTION

This invention relates generally to solid material comminution apparatus and, more particularly, to adjustable shearbars for forage harvesters.

Some of the known adjustment apparatus for adjusting forage harvester shearbars into proximity with a rotating cutterhead require the coordinated manipulation of many adjustment bolts at each end of the shearbar. Such adjustment apparatus is limited in that it is time consuming and precise adjustment is difficult to attain.

Improved adjustment apparatus have reduced the number of adjustment bolts adjacent each end of the shearbar. However, due to tolerance buildup between several of the parts of the apparatus, precise adjustment remains difficult to attain.

The foregoing illustrates limitations of the known prior art. Thus, it is apparent that it would be advantageous to provide an alternative directed to overcoming one or more of the limitations as set forth above. Accordingly, a suitable alternative is to provide an adjustable shearbar apparatus having a reduced number of parts to improve quick and precise adjustment.

SUMMARY OF THE INVENTION

In one aspect of the present invention, this is accomplished by providing an adjustable shearbar apparatus including a first means for supporting a shearbar substantially along the length of the bar and a second means for supporting the bar adjacent opposite ends of the bar. A lever is pivotally connected to the first support means. First and second portions of the lever support opposite sides of the bar. An adjustment member is connected to the lever for pivoting the lever and moving the bar.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
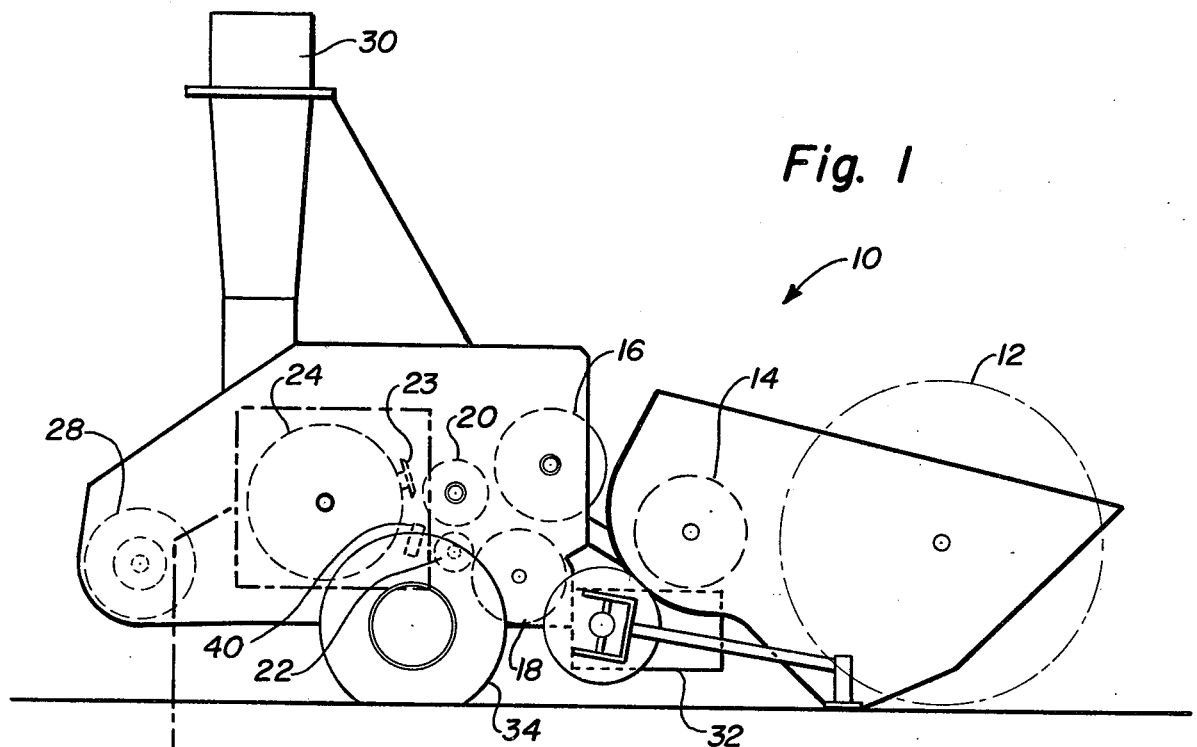
FIG. 1 is a partial side view in cross-section illustrating an exemplary embodiment of a pull-type forage harvester used in connection with the present invention.

FIG. 1 illustrates utility of the present invention in combination with an exemplary forage harvester generally designated 10. It will be recognized that the present invention is usable with a variety of types of harvesters, both the well known pull-type and self-propelled models. Harvester 10 includes a pickup reel 12 and a consolidating auger 14 for feeding crop material to a forward set of feed rolls 16,18 and a rearward set of feed rolls 20,22 which form crop material into a consolidated mat. The crop material is then chopped by cooperative action of knives 23 of a rotating cutterhead 24 and a shearbar 40. The chopped material may be moved by another auger 28 to a blower (not shown) which blows the material from harvester 10 via a spout 30. The foregoing components of well known harvester 10 are supported on a portion of frame 32 which is mobile due to attached wheels 34. A hitch (not shown) is provided for connecting harvester 10 to a towing vehicle.

Figure 2:
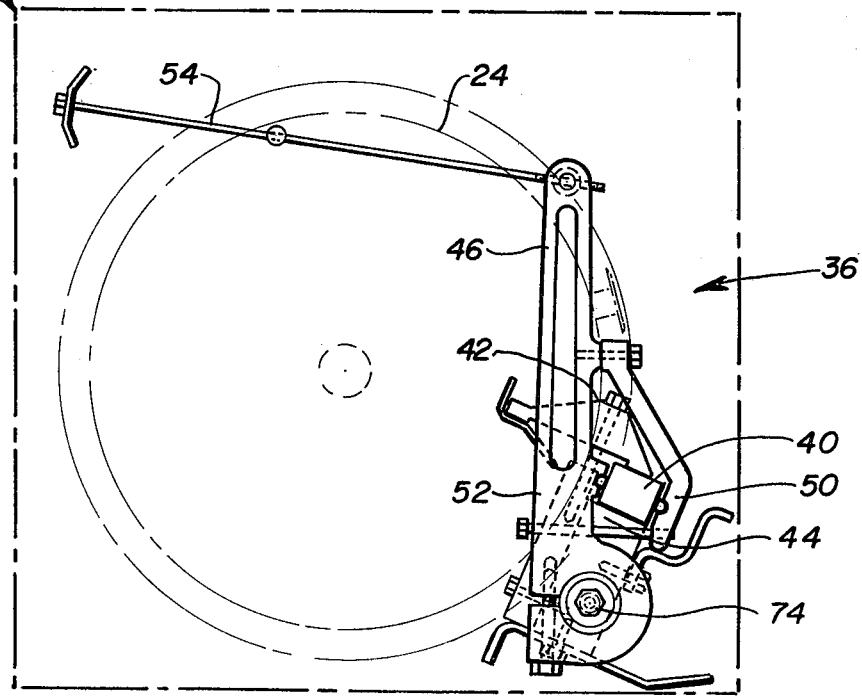
FIG. 2 is an enlarged view illustrating a portion of the harvester of FIG. 1 wherein an embodiment of the present invention is graphically illustrated.

In FIG. 2, the adjustable shearbar apparatus is graphically enlarged from the harvester of FIG. 1 to illustrate some of the main components. The shearbar apparatus is generally designated 36 and is illustrated in proximity with cutterhead 24. The main components of shearbar apparatus 36 includes a shearbar 40 sandwiched between an upper support means 42 and a lower support means 44. A lever 46 is pivotally retained on lower support means 44 by a bolt 74. Lever 46 includes first and second portions 50,52 respectively, supporting opposite sides of bar 40. An adjustment member 54 is connected to lever 46.

Figure 3:
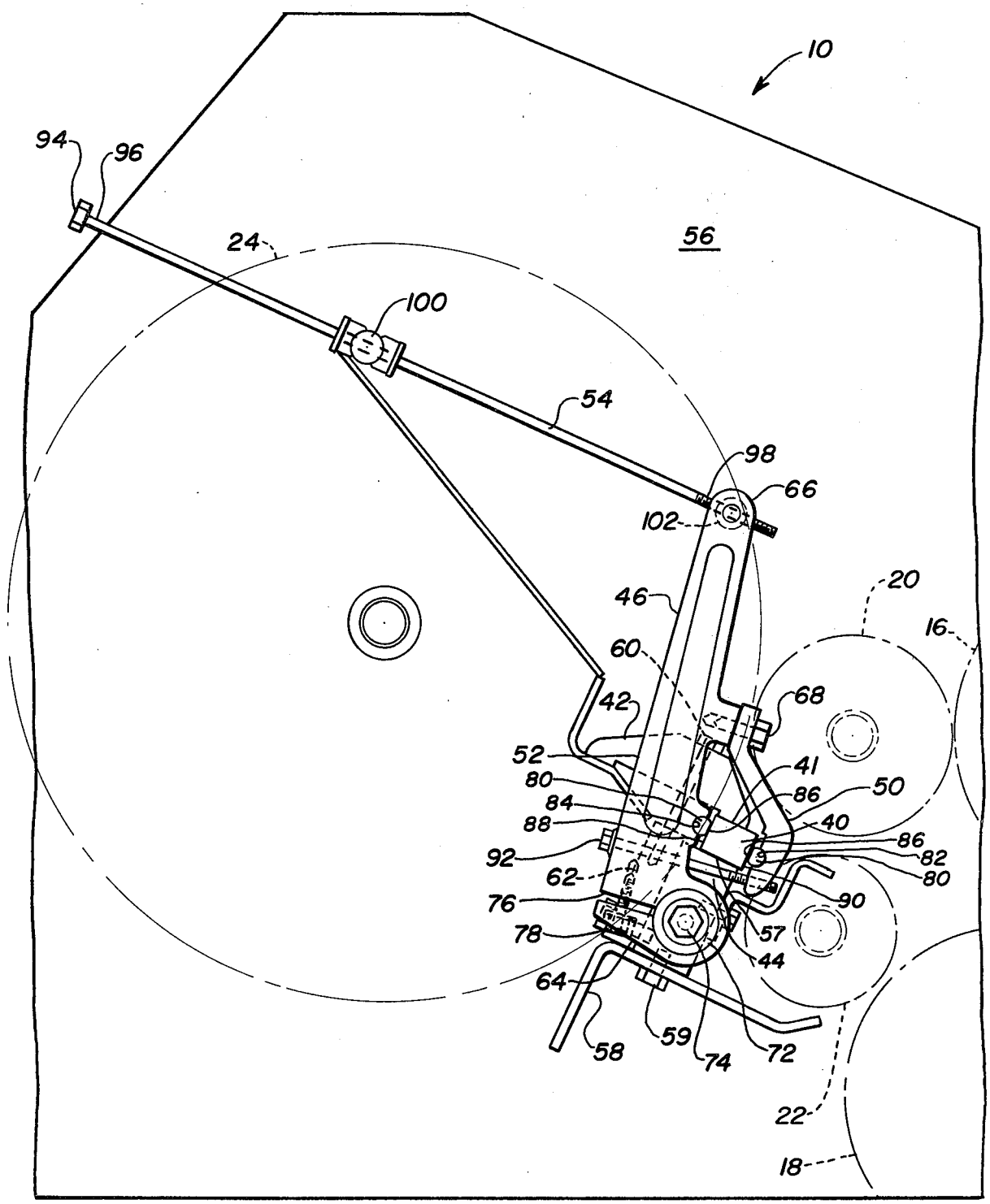
FIG. 3 is a more detailed view illustrating an embodiment of the present invention.

In FIG. 3, a detailed portion of harvester 10 is illustrated including a pair of spaced steel side sheets 56 (only one shown). Well known elongated shearbar 40 extends between side sheets 56 and is supported at a lower surface 57 by lower support means 44 which is elongated and has its opposite ends secured, by bolts 59 or the like, to steel flanges 58 connected to side sheets 56. In this manner, lower steel support means 44 extends along lower surface 57 of shearbar 40 to substantially support the length of bar 40.

A pair of upper support means such as steel blocks 42 are provided adjacent opposite ends of shearbar 40 in the vicinity of side sheets 56. Blocks 42 are secured by bolts 60, or the like, to support members 62 each connected to a respective one of side sheets 56. In this manner, blocks 42 engage an upper surface 41 of bar 40 which is sandwiched between upper and lower support means 42,44 respectively. By virtue of bolts 59,60, support means 42,44 are movable into clamping engagement with shearbar 40.

A steel lever 46 is provided adjacent each side sheet 56. Each lever 46 has a first end 64 and a second end 66. Also, lever 46 includes first portion 50 and second portion 52. First and second portions 50,52, respectively, of lever 46 are preferably formed as separate members connected by a bolt 68. However, if desired, lever 46 can be formed as a unitary member.

First end 64 of lever 46 is pivotally mounted on a cylindrical steel insert 72 which is firmly retained on lower support 44 by a bolt 74. A split 76 is provided in first end 64 of lever 46 for ease of assembly. A bolt 78 is provided to tighten split end 64 to minimize undesirable tolerances.

A steel clamping member such as dowel 80 is movably mounted in a recess 82 in portion 50 and also in a recess 84 in portion 52. Each dowel 80 has a flat surface 86 in clamping engagement with opposite sides 88,90 of shearbar 40. A bolt 92, extends through lever 46 for urging first and second portions 50,52 into clamped engagement with shearbar 40.

An adjustment member 54 is elongated and is provided adjacent each side sheet 56 and has a rotatable hex head 94 at a first end 96. Each adjustment member 54 is threadedly connected at a second end 98 to second end 66 of lever 46. Each adjustment member 54 extends through a steel pin 100 which is pivotally secured to a respective side sheet 56. Second end 98 of member 54 is threadedly received by a pin 102 movably mounted in second end 66 of lever 46.

With the parts assembled as set forth above, it can be seen that rotation of member 54 causes lever 46 to pivot about insert 72. In response to such pivotal movement, portions 50 and 52 rotate about insert 72 causing linear movement of bar 40. During the linear movement, surface 41,57 of bar 40 slide relative to clamped engagement with supports 42,44 and sides 88,90 of bar 40 slide relative to surface 86 of dowels 80. Such linear movement may be either toward or away from cutterhead 24 depending upon the direction of rotation of member 54. Each member 54 can be independently adjusted for movement of each lever 46 resulting in independent adjustment of opposite ends of bar 40.

The foregoing has described an adjustable shearbar apparatus having a reduced number of parts to improve quick and precise adjustment.

It is anticipated that aspects of the present invention, other than those specifically defined in the appended claims, can be obtained from the foregoing description and the drawings.

Having thus described the invention, what is claimed is:

1. In a forage harvester, adjustable shearbar apparatus comprising,
   spaced opposing side sheets,
   an elongated shearbar having opposing sides,
   lower support means for supporting the shearbar, said lower support means being an elongated support member extending between and connected to said side sheets and extending substantially along the length of said shearbar,
   upper support means connected to said side sheets for urging said shearbar against said lower support means adjacent opposite ends of said shearbar,
   a pair of levers pivotally connected to said lower support means, said levers each having first and second portions disposed on said opposing sides of said shearbar,
   means for securely clamping said first and second portions against said opposing sides of said shearbar, and
   means for pivoting said levers and moving said shearbar linearly relative to said lower support means, said means for pivoting including adjustment members coupled directly to said levers.

2. In a forage harvester, as set forth in claim 1, wherein said opposing sides of said shearbar comprise front and rear planar areas, and said means for clamping include surfaces in sliding engagement with said planar areas whereby said surfaces slidably engage said planar areas in a direction generally perpendicular to the linear motion of said shearbar under conditions when said levers are being pivoted.

3. In a forage harvester, as set forth in claim 2, wherein said surfaces in sliding engagement with said planar areas are provided on intermediate members disposed between said first and second portions and said front and rear planar areas, respectively.

4. In a forage harvester, as set forth in claim 3 wherein said intermediate members comprise dowels, and said first and second portions include recesses adapted to accommodate said dowels whereby said dowels are clamped against said planar areas of said shearbar and move in a generally perpendicular direction relative to the linear movement of said shearbar under conditions where said levers are being pivoted.

5. In a forage harvester, as set forth in claim 4, wherein said dowels are generally round in cross section with a chordal section removed to form said surface in sliding engagement with said planar area.

* * * * *